United States Patent [19]
Romesburg

[11] Patent Number: 5,966,438
[45] Date of Patent: *Oct. 12, 1999

[54] METHOD AND APPARATUS FOR ADAPTIVE VOLUME CONTROL FOR A RADIOTELEPHONE

[75] Inventor: Eric D. Romesburg, Chapel Hill, N.C.

[73] Assignee: Ericsson Inc., Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/611,121

[22] Filed: Mar. 5, 1996

[51] Int. Cl.$^6$ ............................. H04M 1/64; H04M 1/00
[52] U.S. Cl. ............................. 379/387; 379/68; 379/86; 379/388; 379/389; 379/390
[58] Field of Search ..................... 379/390, 391, 379/392, 56, 57, 58, 387, 68, 863, 388, 389; 381/357, 94, 104, 107

[56] References Cited

U.S. PATENT DOCUMENTS

| | | | |
|---|---|---|---|
| 4,122,507 | 10/1978 | Queen | 361/94 |
| 4,296,278 | 10/1981 | Cullison et al. | 179/1 |
| 4,490,691 | 12/1984 | Dolby | 333/14 |
| 4,633,483 | 12/1986 | Takahashi et al. | 375/25 |
| 4,715,063 | 12/1987 | Haddad et al. | 379/390 |
| 4,721,923 | 1/1988 | Bares et al. | 330/284 |
| 4,741,018 | 4/1988 | Potratz et al. | 379/58 |
| 4,843,621 | 6/1989 | Potratz et al. | 379/58 |
| 4,847,897 | 7/1989 | Means | 379/390 |
| 4,893,349 | 1/1990 | Eastmond et al. | 455/205 |
| 5,014,294 | 5/1991 | Kromenaker et al. | 379/58 |
| 5,084,865 | 1/1992 | Koike | 370/32.1 |
| 5,115,471 | 5/1992 | Liden | 381/106 |
| 5,131,032 | 7/1992 | Esaki et al. | 379/410 |
| 5,155,743 | 10/1992 | Jacobs | 375/28 |
| 5,170,435 | 12/1992 | Rosen et al. | 381/86 |
| 5,226,178 | 7/1993 | Eastmond et al. | 455/23 |
| 5,237,562 | 8/1993 | Fujii et al. | 370/32.1 |
| 5,243,657 | 9/1993 | Cotton | 381/57 |
| 5,467,393 | 11/1995 | Rasmusson | 379/388 |
| 5,475,731 | 12/1995 | Rasmusson | 379/3 |
| 5,646,991 | 7/1997 | Sih | 379/410 |

FOREIGN PATENT DOCUMENTS

| | | |
|---|---|---|
| 0 290 952 A3 | 5/1988 | European Pat. Off. . |
| 0500356A2 | 8/1992 | European Pat. Off. . |
| 0 505 645 A1 | 9/1992 | European Pat. Off. . |
| 0654954A1 | 5/1995 | European Pat. Off. . |
| 0682437A2 | 11/1995 | European Pat. Off. . |
| 0717547A2 | 6/1996 | European Pat. Off. . |
| 0767570A2 | 4/1997 | European Pat. Off. . |
| 3837538 A1 | 8/1989 | Germany . |
| 2288959A | 11/1995 | United Kingdom . |
| WO 93/18626 | 9/1993 | WIPO . |
| WO96/27255 | 9/1996 | WIPO . |

OTHER PUBLICATIONS

Howard M. Tremaine, *Equalizers, Audio Cyclopedia*, p. 305.
PCT Search Report, PCT/US 97/03261, Mar. 25, 1998.
Rabiner, *Digital Processing of Speech Signals*, Bell Laboratories, Incorporated, 1978, pp. 177, 239.

*Primary Examiner*—Fan S. Tsang
*Assistant Examiner*—Allan Hoosain
*Attorney, Agent, or Firm*—Myers Bigel Sibley & Sajovec

[57] ABSTRACT

An adaptive volume controlled radiotelephone system includes a microphone, a loudspeaker, a transceiver, and an adaptive volume control. The microphone generates an output electrical audio signal in response to sound, and the loudspeaker produces sound in response to an input electrical audio signal. The transceiver is responsive to the microphone and transmits radiotelephone communications to a remote party and receives radiotelephone communications from the remote party to generate the input electrical audio signal. The adaptive volume control is responsive to the output electrical audio signal and selects an amplitude of the sound produced by the loudspeaker so that the amplitude of the sound produced by the loudspeaker increases as the amplitude of the sound received at the microphone increases and decreases as the amplitude of the sound received at the microphone decreases.

24 Claims, 5 Drawing Sheets

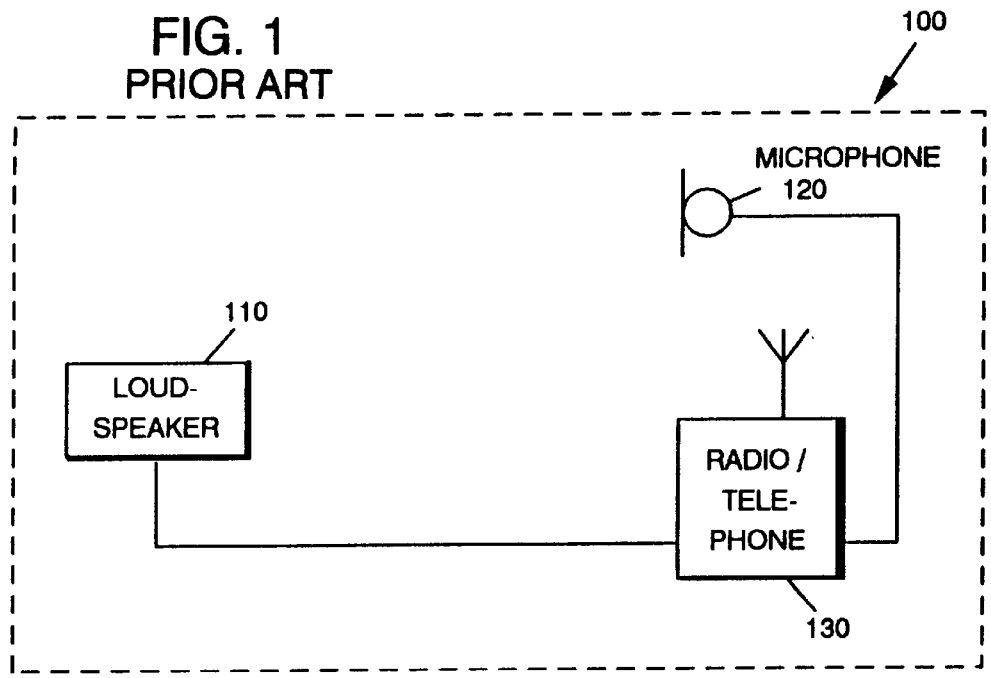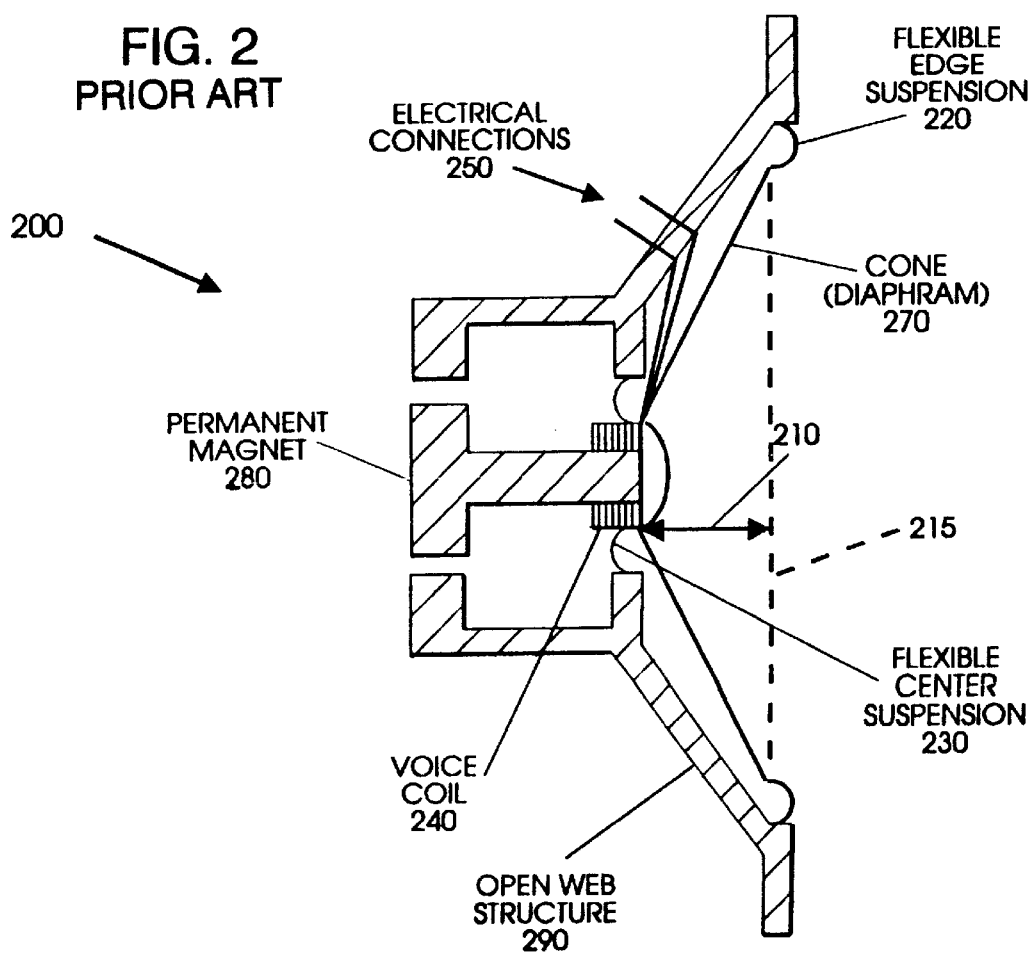

METHOD AND APPARATUS FOR ADAPTIVE VOLUME CONTROL FOR A RADIOTELEPHONE

FIELD OF THE INVENTION

The present invention relates to the field of audio systems, and more particularly to audio systems such as a cellular radiotelephone for use in environments with high levels of ambient noise such as an automobile.

BACKGROUND OF THE INVENTION

For reasons of safety and convenience, cellular radiotelephones often provide hands-free operation. By using a loudspeaker and external microphone, the driver of an automobile may engage in telephone conversations without having to take his hands from the steering wheel. A conventional hands-free system is illustrated in FIG. 1. As shown, a radiotelephone 130 is connected to a remote loudspeaker 110 and a microphone 120 located within an automobile (represented by the box 100). Often, the volume of the loudspeaker 110 must be turned up quite loud for the driver to be able to hear the caller over ambient noise such as the noise of the engine, wind and road. Radiotelephones 130 still commonly use a moving coil loudspeaker 110. In fact, radiotelephones often have the loudspeaker placed in the handset of the radiotelephone, thereby restricting the size of the loudspeaker 110 to the space available in the handset.

FIG. 2 represents a cross-sectional schematic view of a moving coil loudspeaker. A flexible edge suspension 220 and a flexible center suspension 230 freely suspend a diaphragm element 270 in an open frame housing 290. The diaphragm 270 is nominally conical in shape. The diaphragm 270 is mechanically coupled to a voice coil 240 which is situated around a permanent magnet 280. Electrical audio signals (i.e., alternating currents of varying frequency and amplitude) are coupled to the coil 240 via a pair of wires 250.

The alternating currents of the electrical audio signals coupled to the coil 240 give rise to magnetic fields oriented either parallel or antiparallel to the magnetic field of the permanent magnet 280. The orientation of the magnetic fields depends upon the direction of current flow through the coil 240. The magnetic fields created by the alternating currents in the coil 240 establish either forces of attraction or repulsion with respect to the magnetic field of the permanent magnet 280. Because of the mechanical coupling between the coil 240 and the diaphragm 270 and the freedom of movement of the diaphragm in the plane parallel to the forces created by parallel or anti-parallel magnetic fields (i.e. perpendicular to plane 215), changes in the direction and amplitude of the current generated by the electrical audio signal are translated into axial dislocations of the diaphragm 270.

Pressure waves generated by the axial dislocation of the diaphragm 270 propagate in the air as sound waves. For a given frequency, larger dislocations are associated with greater levels of volume. The magnitude of the sound pressure level, or volume, is directly related to the magnitude of the dislocation 210 of the diaphragm element 270 with regard to plane 215. To increase the volume of the sound (i.e., sound pressure levels) emanating from a dynamic loudspeaker such as that illustrated in FIG. 2, one simply increases the amplitude of the drive signal to the electrical contacts 250 which results in an increased deflection 210 of the diaphragm 270.

To faithfully reproduce sound, the loudspeaker 200 should have a relatively flat frequency response. In other words, over the loudspeaker's range of operating frequencies, electrical signals of the same amplitude should produce the same sound pressure level irrespective of the frequency of the signal. FIG. 3 illustrates a number of frequency responses for loudspeakers. The solid line 310 of FIG. 3 represents the ideal flat frequency response for a loudspeaker.

Unfortunately, physical realities give the loudspeaker 200 less than ideal frequency characteristics. Because of factors such as size and materials, most loudspeakers (especially low-cost versions) have sound reproduction characteristics that are a relatively strong function of frequency. The dotted line 320 of FIG. 3 shows an example of conventional loudspeaker characteristics. FIG. 3 also shows the resonant frequency 330 of the loudspeaker. As illustrated in FIG. 3, the resonant frequency 330 is the frequency at which the loudspeaker produces maximum sound pressure levels for a given input signal level.

As seen in FIG. 2, the diaphragm 270 is physically constrained with regard to the absolute magnitude 210 of dislocation. Overload or clipping of the loudspeaker occurs when the amplitude of the drive signal applied to the electrical terminals 250 would require the diaphragm 270 to move beyond the physical limitation of the suspensions 220, 230 or the open frame housing 290 of the loudspeaker. FIG. 4 illustrates that applying a fixed gain to a loudspeaker having the loudspeaker characteristic 410 shown by the dotted line results in the response shown at 420. From FIG. 4 it can be seen that loudspeaker overload will often first occur at the resonant frequency 330 of the loudspeaker. Loudspeaker overload occurs when the response exceeds the clipping level 400 as seen in FIG. 4. While illustrated as a linear function in FIG. 4 for purposes of illustration, the clipping level 400 is actually a highly non-linear and frequency dependent effect. Loudspeaker overload causes distortion of signals near the resonant frequency and produces harmonic overtones which interfere with audio signals at higher frequencies.

Use of a loudspeaker in a radiotelephone apparatus magnifies the phenomena of overload because the loudspeaker primarily reproduces human speech. As shown in FIG. 5, the power density spectrum for human speech has a definite bias for lower frequencies. Most of the energy of human speech lies at or near 500 Hz, however, the higher frequencies (i.e., 1000–3000 Hz), which are associated with the lower amplitude levels, provide most of the intelligibility. As can be seen from FIG. 5, the power density in human speech often closely matches the resonant frequency of the conventional loudspeaker used in a radiotelephone handset. For example, for loudspeakers of the type conventionally used within radiotelephone handsets, a resonant frequency of near 600 Hz is common. Therefore, volume levels which would not produce overload when reproducing music or other audio signals may result in overload when reproducing human speech.

Loudspeaker overload generates harmonic overtones in the higher frequencies where the intelligibility information of human speech exists. Overload causes wide-band distortion at high volumes which combines with the informational higher frequencies of the audio signal, thereby making it difficult to understand the speech. When overload occurs, increasing the amplitude of the audio signal does not increase the intelligibility of the speech carried in the audio signal. Thus, for example, the driver of an automobile faces a situation where turning up the volume to overcome the ambient noise of the automobile results in an unintelligible, albeit audible, garble.

U.S. Pat. No. 5,467,393 entitled "Method and Apparatus for Volume and Intelligibility Control for a Loudspeaker," to Rasmusson and assigned to the assignee of the present invention, discusses selectively compressing the signal supplied to a loudspeaker based upon the volume setting for the sound level to be produced by the loudspeaker. This improves the intelligibility of human speech produced by a loudspeaker at high volume levels. Compression of the signal to the loudspeaker prevents the loudspeaker from overloading, and the level of compression may be adjusted based on the volume setting.

The loudspeaker of this radiotelephone, however, may still reproduce speech which is difficult to understand if the level of background noise in the vicinity of the telephone is variable. For example, when a loudspeaker radiotelephone is used in an automobile, the level of background noise changes as the speed changes, as the wind changes, as a window is rolled up or down, as other vehicles pass by, etc. As the background noise increases, the speech reproduced by the loudspeaker may get swamped out. On the other hand, the loudspeaker may be too loud when the background noise subsides. While the near-end user can compensate by manually adjusting the volume of the loudspeaker, this may be difficult or even unsafe when driving.

Accordingly, there continues to exist a need in the art for a loudspeaker cellular radiotelephone which compensates for variations in the level of background noise in the vicinity of the telephone.

SUMMARY OF THE INVENTION

One object of the present invention is to provide an improved loudspeaker telephone.

Another object of the present invention is to provide improved hands free operation of a loudspeaker radiotelephone in conditions of variable ambient noise.

These and other objects are provided, according to the present invention, by loudspeaker radiotelephone systems and methods wherein the amplitude of the sound produced by the loudspeaker is adaptively controlled in response to the amplitude of the sound received at the microphone so that the amplitude of the sound produced by the loudspeaker increases and decreases as the amplitude of the sound received at the microphone increases and decreases. Accordingly, a loudspeaker radiotelephone used in a noisy environment such as an automobile can adapt to changing levels of noise without requiring action on the part of the driver which could be unsafe. That is, as the level of noise in the car changes due to factors such as wind, engine, and traffic, the volume of the loudspeaker automatically adapts so that the speech of the remote party is not swamped out or broadcast at a volume too high with respect to the noise in the automobile.

In addition, the radiotelephone systems and methods of the present invention preferably reduce an echo portion of the signal generated by the microphone so that the sound produced by the loudspeaker does not significantly affect the selection of the amplitude of the sound produced thereby. In other words, the reduction of the echo reduces feedback from the loudspeaker which might otherwise be interpreted by the radiotelephone system as noise in the automobile. The volume of the loudspeaker is therefore not increased in response to the reproduction of speech by the loudspeaker.

According to one embodiment of the present invention, an adaptive volume controlled radiotelephone system includes a microphone, a loudspeaker, a transceiver, and an adaptive volume control. The microphone generates an output electrical audio signal in response to sound, and the loudspeaker produces sound in response to an input electrical audio signal. The transceiver transmits radiotelephone communications to a remote party responsive to the microphone and receives radiotelephone communications from the remote party via radiofrequency channels to generate the input electrical audio signal. The adaptive volume control is responsive to the output electrical audio signal and selects an amplitude of the sound produced by the loudspeaker so that the amplitude of the sound produced by the loudspeaker increases as the amplitude of the sound received at the microphone increases and decreases as the amplitude of the sound received at the microphone decreases. Accordingly, the volume of the loudspeaker is automatically adjusted in response to the volume of noise received at the microphone.

This radiotelephone system also preferably includes an echo reducer. The echo reducer is responsive to the input electrical audio signal and reduces an echo portion of the output electrical audio signal so that the sound produced by the loudspeaker does not significantly affect operation of the adaptive volume control. The effect of acoustic feedback on the operation of the adaptive volume control is thereby reduced.

The radiotelephone system can also include a near-end user voice detector which detects when a near-end user is speaking. The adaptive volume control is responsive to this near-end user voice detector so that the amplitude of the sound produced by the loudspeaker is not increased when the near-end user speaks. Alternately, the adaptive volume control can continue selecting the amplitude of the sound produced by the loudspeaker when the near-end user is speaking so that the amplitude of the sound produced by the loudspeaker increases when the near-end user is speaking. Thus, the remote party can more easily break into the conversation when the near-end user is speaking.

The radiotelephone system can also include a volume estimator which estimates an amplitude of the received radiotelephone communications. The adaptive volume control is further responsive to the volume estimator so that variations in the amplitude of the sound produced by the loudspeaker resulting from variations in the amplitude of the received radiotelephone communications are reduced. The radiotelephone system can also include a loudspeaker overload reducer. The overload reducer is responsive to the selected amplitude of the volume control, and selectively increases the amplitude of a high frequency portion of the input electrical audio signal to reduce overload in the loudspeaker and thereby increase intelligibility of human speech reproduced by the loudspeaker. A noise suppressor which reduces a noise portion of the output electrical audio signal can also be included. Accordingly, near-end user speech is more accurately transmitted to the remote party.

The radiotelephone of the present invention provides adaptive volume control so that the volume of the loudspeaker is adjusted in proportion to the volume of sound received at the microphone. Thus, the volume of the loudspeaker increases when the noise in the vicinity of the radiotelephone increases, such as when the automobile window is rolled down. In contrast, the volume of the loudspeaker decreases when the noise in the vicinity of the radiotelephone decreases, such as when the window is rolled up. Furthermore, the echo reducer reduces the effect of acoustic feedback which might otherwise cause the volume of the loudspeaker to be increased in response to its own operation.

BRIEF DESCRIPTION OF THE DRAWINGS

FIG. 1 is a simplified block diagram showing a conventional hands-free arrangement of a radiotelephone as used in a vehicular application.

FIG. 2 is a simplified cross-sectional view of a conventional moving coil loudspeaker.

DESCRIPTION OF A PREFERRED EMBODIMENT

The present invention now will be described more fully hereinafter with reference to the accompanying drawings in which a preferred embodiment of the invention is shown. The present invention may, however, be embodied in many different forms and should not be construed as limited to the embodiment set forth herein; rather, this embodiment is provided so that this disclosure will be thorough and complete, and will fully convey the scope of the invention to those skilled in the art.

Figure 3:
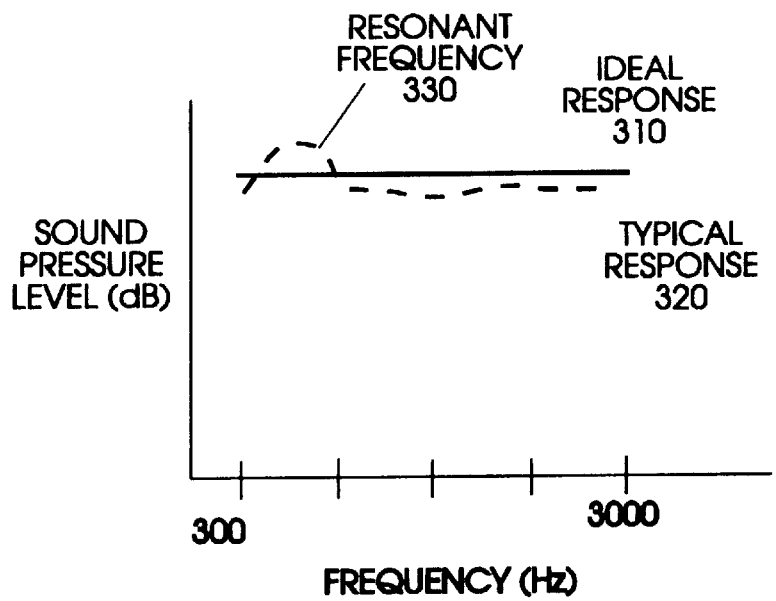
FIG. 3 graphically illustrates the frequency characteristics of a conventional moving coil loudspeaker.
Figure 4:
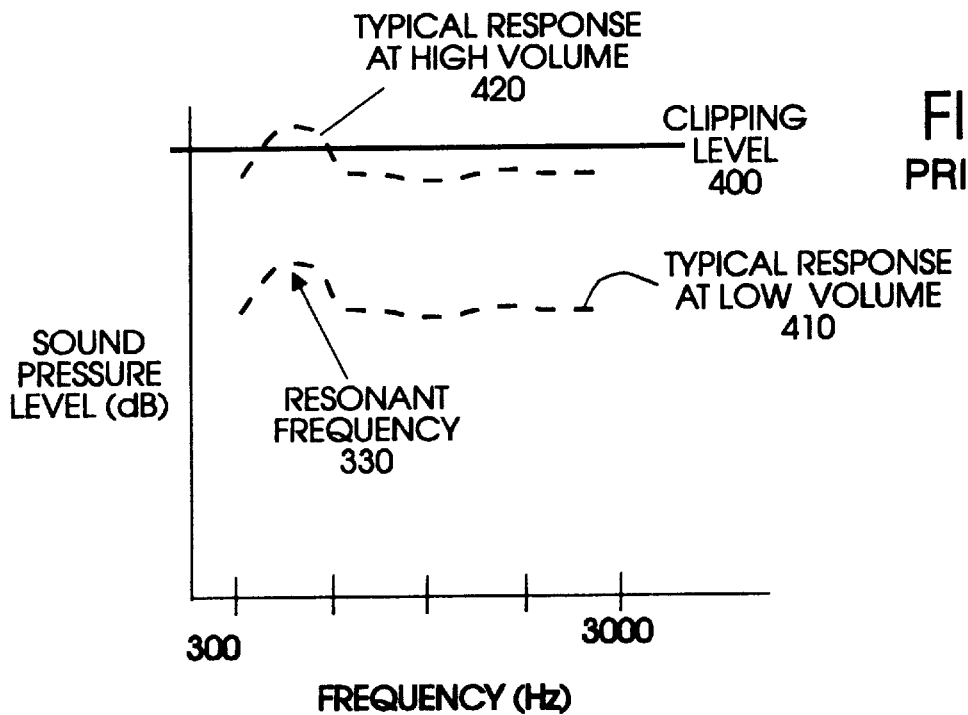
FIG. 4 graphically illustrates the frequency characteristics of a conventional moving coil loudspeaker at a low and high volume level.
Figure 5:
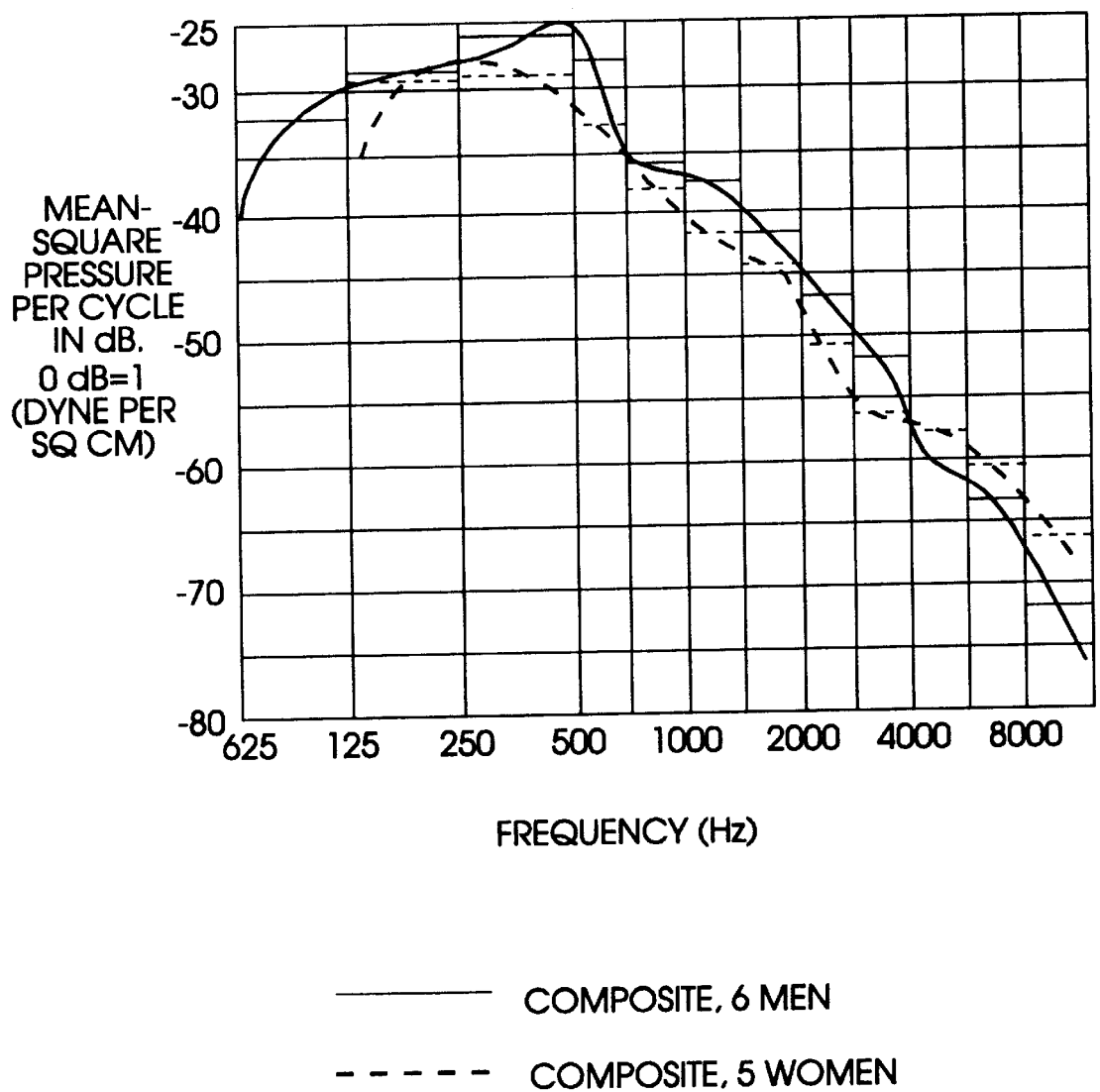
FIG. 5 graphically illustrates the long-term power density spectrum for continuous human speech.
Figure 6:
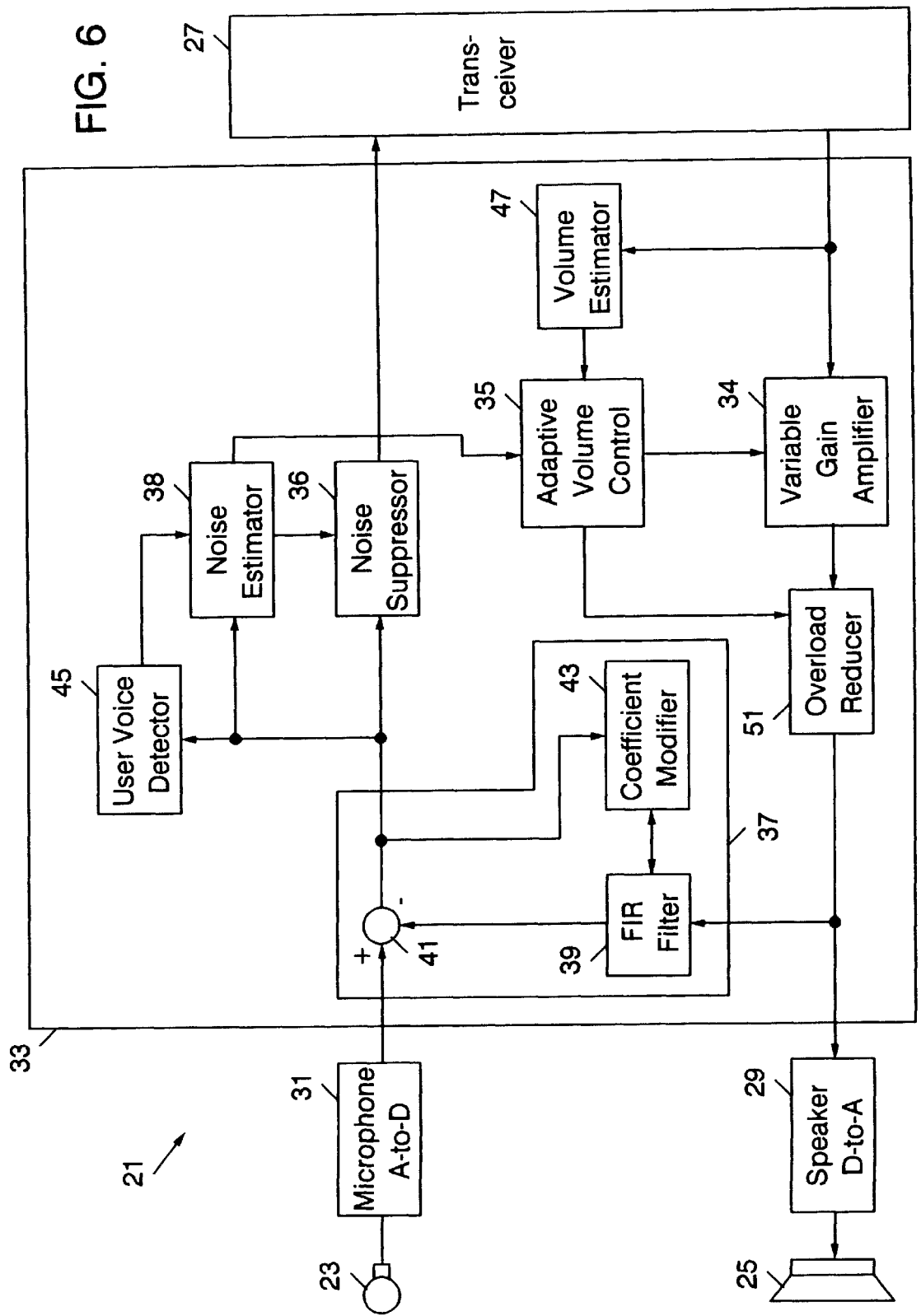
FIG. 6 is a block diagram of a cellular radiotelephone according to the present invention.

A block diagram of a cellular radiotelephone 21 according to the present invention is shown in FIG. 6. This radiotelephone 21 includes a microphone 23 for generating an output electrical audio signal in response to sound, and a loudspeaker 25 for producing sound in response to an input electrical audio signal.

A transceiver 27 transmits radiotelephone communications to a remote party responsive to the microphone 23 using another radiotelephone or a conventional landline telephone. The transceiver 27 also receives radiotelephone communications from the remote party. For example, the transceiver 27 can transmit and receive radiotelephone communications to and from a base station of a cellular radiotelephone system via radiofrequency channels thereby facilitating communications with either another cellular radiotelephone or a landline telephone.

In a preferred embodiment, the transceiver 27 transmits and receives digital communications. Accordingly, the received communications can be processed by the digital signal processor (DSP) 33 to generate the digital input electrical audio signal which can be converted from a digital signal to an analog signal by loudspeaker Digital-to-Analog converter 29. In addition, the output electrical audio signal can be converted from an analog signal to a digital signal by microphone Analog-to-Digital converter 31 and then processed by digital signal processor 33 to generate the transmitted communications.

Alternately, the transceiver 27 can transmit and receive analog radiotelephone communications, and these communications can be conditioned by an analog processor thereby eliminating the need for the loudspeaker D-to-A converter and the microphone A-to-D converter. In yet another alternative, the transceiver can transmit and receive analog radiotelephone communications, and these communications can be conditioned by a digital signal processor. Accordingly, the radiotelephone may include the loudspeaker D-to-A converter and the microphone A-to-D converter, as well as D-to-A and A-to-D converters between the transceiver and the digital signal processor.

The radiotelephone of the present invention also includes an adaptive volume control 35 which is responsive to the output electrical audio signal generated by the microphone 23. The adaptive volume control 35 selects an amplitude of the sound produced by the loudspeaker 25 so that the amplitude of the sound produced by the loudspeaker 25 increases as the amplitude of the sound received at the microphone 23 increases and decreases as the amplitude of the sound received at the microphone 23 decreases. In particular, an output of the adaptive volume control 35 can be applied to the variable gain amplifier 34 which adjusts the gain applied to the input electrical audio signal in response to the selected amplitude.

Stated in other words, the output electrical audio signal generated by the microphone 23 can be used to represent a level of background noise which changes as the conditions around the radiotelephone change. In order to better understand the speech reproduced by the loudspeaker 25, the volume of the loudspeaker should be increased as the background noise increases, and decreased as the background noise decreases. The adaptive volume control 35 selects the volume for the loudspeaker 25 based on the level of background noise which is monitored through the microphone 23.

As shown in FIG. 6, the output electrical audio signal generated by the microphone 23 is processed through a noise suppressor 36 before being transmitted to the remote party by the transceiver 27. In particular, a noise estimator 38 monitors the output electrical audio signal and determines a portion of that signal which is noise. (In the case of a loudspeaker radiotelephone used in an automobile, the noise can be caused by wind, road, engine, traffic, etc.) This estimate of a noise portion of the signal is provided to the noise suppressor 36 where the noise portion of the output electrical audio signal is reduced. In addition, a signal representing the amplitude of the noise is provided by the noise estimator 38 to the adaptive volume control 35. This signal is used by the adaptive volume control to select the amplitude of the sound to be produced by the loudspeaker 25.

Accordingly, the radiotelephone of the present invention can automatically adapt to changing levels of background noise without requiring action on the part of the near-end user. This feature can be particularly advantageous when used with a loudspeaker radiotelephone in an automobile because the level of background noise can be highly variable, there is a distance between the near-end user and the loudspeaker, and the distraction of manually adjusting the volume can be dangerous when driving. This radiotelephone 21 can thus automatically adjust to changing levels of background noise which may result from, for example, rolling a window up or down, changing speed, changing wind, passing another vehicle, being passed, etc.

Furthermore, because the adaptive volume control 35 can be provided by digital signal processing, this feature can be provided by programming a digital signal processor as used in conventional digital cellular radiotelephones. Stated in other words, the adaptive volume control can be implemented by programming existing hardware. Accordingly, this feature can be provided without adding significant manufacturing cost or size to the radiotelephone.

The radiotelephone 21 can also include an echo reducer 37 which is responsive to the input electrical audio signal. The echo reducer 37 reduces an echo portion of the output electrical audio signal which is generated by the microphone 23 in response to sound. By reducing the echo portion of the output electrical audio signal, the sound produced by the loudspeaker 25 does not significantly affect the operation of the adaptive volume control 35. In addition, the quality of the output electrical audio signal is improved for transmission by the transceiver 27 to the remote party.

This aspect of the present invention is particularly advantageous when used with a hands-free loudspeaker radiotelephone in an automobile. This is because there can be an acoustic feedback path from the loudspeaker 25 to the microphone 23. Without the echo reducer 37, the speech of the remote party which is reproduced by the loudspeaker 25 can be received by the microphone 23 (acoustic feedback) indicating a higher level of background noise causing the adaptive volume control 35 to increase the volume. This feedback could cause the volume to increase as long as the remote party continues talking. The echo reducer 37 reduces this problem by reducing the feedback.

The echo reducer 37 can be implemented using an echo reducing filter such as a Finite-Impulse-Response (FIR) filter 39, the output of which is subtracted from the output electrical audio signal at subtractor 41. The coefficients of the FIR filter 39 can be continuously improved using a Least Means Squares (LMS) algorithm. As shown, the output of subtractor 41 can be provided to coefficient modifier 43 which modifies the coefficients of the FIR filter 39 using an LMS algorithm.

Various implementations of echo reducing filters are discussed for example in U.S. Pat. No. 5,237,562 to Fujii et al., entitled "Echo Path Transition Detection"; U.S. Pat. No. 5,131,032 to Esaki et al., entitled "Echo Canceller and Communication Apparatus Employing the Same"; and U.S. Pat. No. 5,084,865 to Koike, entitled "Echo Canceller Having FIR and IIR Filters for Canceling Long Tail Echoes". More echo reducing filters are discussed in U.S. Pat. No. 5,475,731 to Rasmusson entitled "Echo-Canceling System and Method Using Echo Estimate to Modify Error Signal", U.S. application Ser. No. 08/393,711 to Dent et al. entitled "Apparatus and Method for Canceling Acoustic Echoes Including Non-Linear Distortions in Loudspeaker Telephones" filed Feb. 24, 1996, and U.S. application Ser. No. 08/393,726 to Dent et al. entitled "Apparatus and Method for Adaptively Precompensating for Loudspeaker Distortions", filed Feb. 24, 1995, each assigned to the assignee of the present invention. All of the six above cited references are hereby incorporated in their entirety herein by reference.

As discussed above with regard to the adaptive volume control 35, this feature can be implemented through digital signal processing. By programming an existing digital signal processor, there is no need to add additional hardware. Accordingly, the echo reducer 37 can be implemented without adding significant manufacturing costs or size. In addition, the echo reducer 37 has the advantage of reducing the echo of the remote party's voice back to the remote party.

The radiotelephone 21 can also include a near-end user voice detector 45 for detecting when a near-end user of the radiotelephone 21 is talking. According to this aspect of the present invention, the adaptive volume control 35 is further responsive to the near-end user voice detector 45 so that the amplitude of the sound produced by the loudspeaker 25 is not increased when the near-end user speaks. In particular, the noise estimate generated by the noise estimator 38 is not updated when the near-end user of the radiotelephone 21 is speaking so that the volume of the loudspeaker 25 is not increased when the near-end user speaks. This feature also has the advantage of not including the near-end user's voice in the noise estimate which is removed from the output electrical audio signal by noise suppressor 36.

The near-end user voice detector 45 preferably detects human speech by identifying harmonic structures such as vowel sounds which are relatively unique to human speech. Alternately, the near-end user voice detector 45 may operate by determining a minimum threshold of predetermined frequencies which are generally associated with human speech, or by determining a minimum threshold of amplitude above which speech is assumed. The voice detector may also be adapted to learn and recognize the particular voice patterns of the near-end user. By not adjusting the volume of the loudspeaker 25 when the near-end user is speaking, the volume of the speech of the remote party is not increased when both parties are talking. As with the adaptive volume control 35, the near-end user voice detector 45, noise estimator 38, and noise suppressor 36 can be implemented in DSP 33.

Alternately, the adaptive volume control 35 can continue selecting the amplitude of the sound produced by the loudspeaker 25 when the near-end user is speaking. Accordingly, the amplitude of the sound produced by the loudspeaker 25 increases when the near-end user is speaking. This feature may be advantageous in that the remote party can more easily break into the conversation when the near-end user is speaking. Furthermore, the radiotelephone 21 can include a near-end user input for selecting whether or not the adaptive volume control 35 updates the selected amplitude for the loudspeaker 25 when the near-end user is speaking. The near-end user input can be a two position switch which sets and clears a flag in the digital signal processor. In this case, the adaptive volume control 35 preferably has a relatively short time constant (fast response) so that the volume of the loudspeaker 25 is adjusted quickly when the near-end user starts or stops talking.

The radiotelephone 21 can also include a volume estimator 47 for estimating an amplitude of the radiotelephone communications received by the transceiver 27. The adaptive volume control 35 is responsive to the volume estimator 47 so that variations in the amplitude of the sound produced by the loudspeaker 25 resulting from variations in the amplitude of the radiotelephone communications received by the transceiver 27 are reduced. Accordingly, variations in the volume of the speech reproduced by loudspeaker 25 due to variations in the volume of the speech of the remote party can be reduced. The volume of speech of a remote party may vary from call to call due to differences in gain along different communications channels. For example, different gains can result from differences in remote telephones, differences in landline connections, differences in cellular radiofrequency channels, etc. In addition, the volume of the speech of the remote party may vary within a call due to movement of the remote party relative to the remote telephone, variations of the remote party's voice, etc.

As shown in FIG. 6, the volume estimator 47 receives the radiotelephone communications as an input from the transceiver 27. The volume estimator 47 generates an output which is representative of an average volume of the speech of the remote party. Preferably, the volume estimator generates the output based on an average volume taken over a period of time sufficiently long so as to take into account pauses in speech and other anomalies. The volume estimator 47 also preferably recognizes periods when the remote party is not speaking so that background noise from the remote telephone is not significantly amplified during periods of silence. The output of the volume estimator 47 is applied to the adaptive volume control 35. Accordingly, the adaptive volume control 35 can select the amplitude of the sound produced by the loudspeaker 25 as a function of the noise received by the microphone 23 and the variations in the radiotelephone communications received from the transceiver 27.

The radiotelephone 21 can also include a loudspeaker overload reducer 51 which is responsive to the selected amplitude of the adaptive volume control 35. The overload reducer 51 selectively increases the amplitude of a high frequency portion of the input electrical audio signal to reduce overload in the loudspeaker. Accordingly, intelligibility of human speech reproduced by the loudspeaker 25 can be increased at high volumes. In particular, the variable gain amplifier 34 uniformly adjusts the amplitude of all frequencies of the input electrical audio signal within a range that loudspeaker overload is not likely to occur. If the adaptive gain control 35 selects an amplitude beyond this range, the further increases in gain can be provided by the overload reducer 51. The overload reducer 51 selectively increases the amplitude of a high frequency portion of the input electrical audio signal to further increase the volume of the loudspeaker 25 without causing overload.

Thus, if an amplitude is selected by the adaptive volume control 35 that is likely to cause overloading or clipping of the loudspeaker 25, the overload reducer 51 selectively increases the amplitude of a high frequency portion of the input signal thereby reducing overload and enhancing intelligibility. Furthermore, a high frequency portion of the input signal can be spread in time to further increase intelligibility without increasing the peak amplitude. The reduction of loudspeaker overloads is discussed, for example, in U.S. Pat. No. 5,467,393 to Rasmusson entitled "Method and Apparatus for Volume and Intelligibility Control for a Loudspeaker" which is assigned to the assignee of the present invention. This patent is hereby incorporated herein in its entirety by reference.

Each of the features of the radiotelephone 21 discussed above including the adaptive volume control 35, the overload reducer 51, the echo reducer 37, the noise estimator 38, the noise suppressor 36, the near-end user voice detector 45, the volume estimator 47, and the variable gain amplifier 34 can be implemented by digital signal processing techniques. Accordingly, each of these features can be implemented in DSP 33. As many cellular radiotelephones include a DSP, these features can be implemented by programming the DSP and without adding additional hardware. Accordingly, each of these features can be added without significantly increasing the manufacturing costs or size of the radiotelephone. Furthermore, the transceiver can be defined to include one or more of these features as will be understood by one having skill in the art.

The adaptive volume control 35 and other features of the present invention are particularly advantageous when used with a hands-free loudspeaker radiotelephone in an automobile because this application involves an acoustic feedback path through a potentially noisy environment. Accordingly, the adaptive volume control 35 matches the volume of the loudspeaker to the level of noise received by the microphone. These features, however, can also be used with a handheld cellular radiotelephone, a satellite radiotelephone, a cordless landline telephone, a hands-free loudspeaker landline telephone, or a conventional landline telephone. In addition to providing voice communications, the telephones discussed above may also include components for data, video, and/or multimedia communications. In any of these applications, the near-end user may desire that the telephone automatically adjust its volume based on noise received at the microphone.

Figure 7:
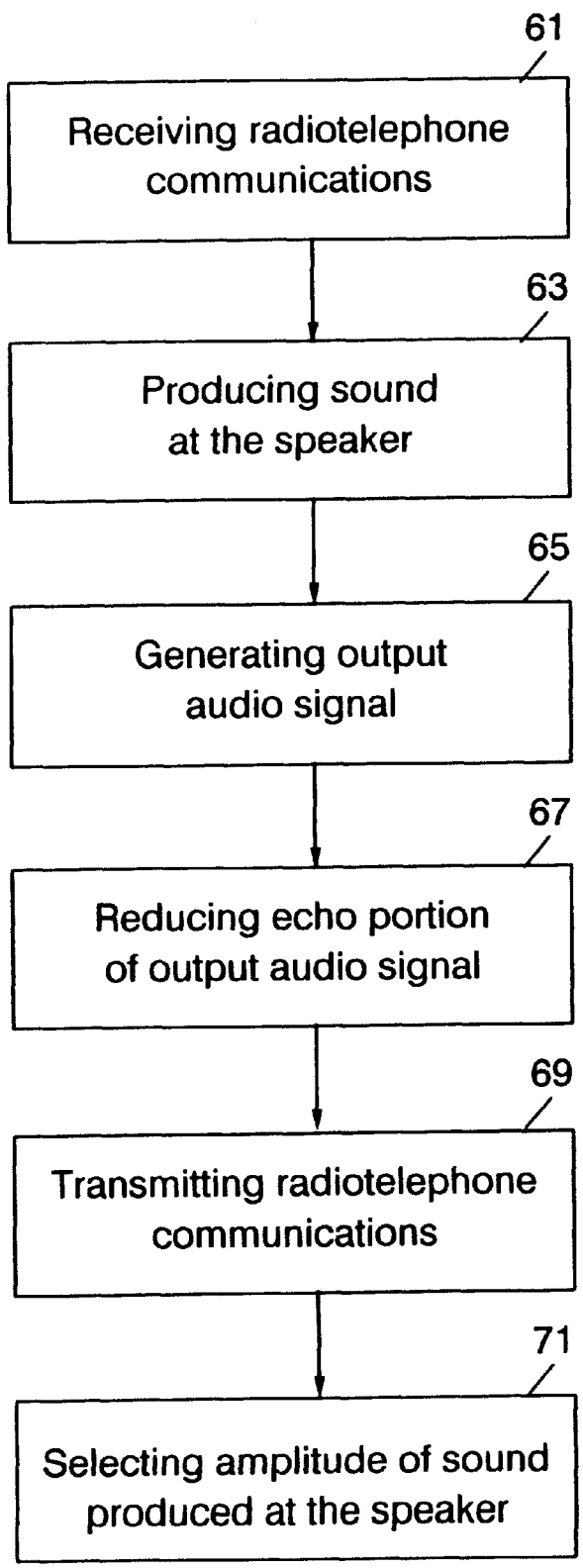
FIG. 7 is a flow chart illustrating operations for adaptively controlling the volume of the radiotelephone of FIG. 6.

Operations for adaptively controlling the volume of the radiotelephone of FIG. 6 are illustrated in FIG. 7. The transceiver 27 receives radiotelephone communications from the remote party at block 61. The received radiotelephone communications are processed by DSP 33 to generate an input electrical audio signal, and the loudspeaker 25 produces sound in response to the input electrical audio signal at block 63. The microphone 23 generates an output electrical audio signal at block 65, and an echo portion of the output electrical audio signal is reduced at block 67. The output electrical audio signal is processed by DSP 33 to generate radiotelephone communications which are transmitted by the transceiver 27 at block 69.

An amplitude of the sound produced at the loudspeaker 25 is selected at block 71. In particular, this amplitude is selected so that it increases as the amplitude of the sound received at the microphone 23 increases and decreases as the amplitude of the sound received at the microphone 23 decreases. Accordingly, the volume of the speech reproduced by the loudspeaker can approximately match the volume of the noise in the vicinity of the radiotelephone.

The operation of selecting the amplitude can include detecting when a near-end user is speaking and maintaining a constant amplitude of the sound produced by the loudspeaker 25 when the near-end user is speaking. Accordingly, the amplitude of the sound produced by the loudspeaker 25 does not significantly increase when the near-end user speaks. Alternately, the amplitude can be selected when a near-end user is speaking so that the amplitude of the sound produced by the loudspeaker increases when the near-end user is speaking. Thus, the remote party can more easily break into the conversation when the near-end user is talking.

In addition, the amplitude of the received radiotelephone communications can be estimated, and variations in the amplitude of the sound produced by the loudspeaker resulting from variations in the amplitude of the received communications reduced. Variations in the speech of the remote party reproduced by the loudspeaker can thereby be reduced.

The amplitude of a high frequency portion of the input electrical audio signal can be selectively increased to reduce overload in the loudspeaker and to increase intelligibility of human speech reproduced by the loudspeaker. Accordingly, overload of the loudspeaker can be reduced and intelligibility increased as the volume of the loudspeaker is increased at high volumes. A noise portion of the output electrical audio signal can also be reduced so that near-end user speech is more accurately transmitted to the remote party.

In the drawings and specification, there has been disclosed a typical preferred embodiment of the invention and, although specific terms are employed, these terms are used in a generic and descriptive sense only and not for purposes of limitation, the scope of the invention being set forth in the following claims.

That which is claimed:

1. An adaptive volume controlled radiotelephone system comprising:

a microphone which generates an output electrical audio signal in response to noise sound;

a loudspeaker which produces sound in response to an input electrical audio signal;

a transceiver which is responsive to the microphone to transmit radiotelephone communications to a remote party and which receives radiotelephone communications from the remote party via radiofrequency channels to generate the input electrical audio signal;

an adaptive volume control which is responsive to the output electrical audio signal and which selects an amplitude of the sound produced by said loudspeaker so that the amplitude of the sound produced by said loudspeaker increases above the amplitude of the noise sound received at said microphone and decreases as the amplitude of the noise sound received at said microphone decreases so that said sound produced by said loudspeaker is not swamped out with respect to the noise sound received by said microphone and so that the sound produced by said loudspeaker is audible over the noise sound; and an echo reducer which is responsive to the input electrical audio signal and which reduces an echo portion of the output electrical audio signal so that the sound produced by said loudspeaker does not significantly affect operation of said adaptive volume control.

2. An adaptive volume controlled radiotelephone system according to claim 1 wherein said adaptive volume control continues selecting the amplitude of the sound produced by said loudspeaker when the near-end user is speaking so that the amplitude of the sound produced by said loudspeaker increases when the near-end user is speaking.

3. An adaptive volume controlled radiotelephone system according to claim 1 further comprising a loudspeaker overload reducer which is responsive to the selected amplitude of said volume control, and which selectively increases the amplitude of a high frequency portion of the input electrical audio signal to reduce overload in said loudspeaker and thereby increase intelligibility of human speech reproduced by said loudspeaker.

4. An adaptive volume controlled radiotelephone system according to claim 1 further comprising a noise suppressor which reduces a noise portion of the output electrical audio signal so that near-end user speech is more accurately transmitted to the remote party.

5. An adaptive volume controlled radiotelephone system according to claim 1 wherein the transceiver transmits the output electrical audio signal with the reduced echo portion thereby reducing echo of the remote party's voice back to the remote party.

6. An adaptive volume controlled radiotelephone system according to claim 1 wherein the echo reducer selectively reduces the echo portion of the output electrical audio signal.

7. An adaptive volume controlled radiotelephone system comprising:

a microphone which generates an output electrical audio signal in response to noise sound;

a loudspeaker which produces sound in response to an input electrical audio signal;

a transceiver which is responsive to the microphone to transmit radiotelephone communications to a remote party and which receives radiotelephone communications from the remote party via radiofrequency channels to generate the input electrical audio signal;

an adaptive volume control which is responsive to the output electrical audio signal and which selects an amplitude of the sound produced by said loudspeaker so that the amplitude of the sound produced by said loudspeaker increases above the amplitude of the noise sound received at said microphone and decreases as the amplitude of the noise sound received at said microphone decreases so that said sound produced by said loudspeaker is not swamped out with respect to the noise sound received by said microphone and so that the sound produced by said loudspeaker is audible over the noise sound; and a near-end user voice detector which detects when a near-end user is speaking, wherein said adaptive volume control is further responsive to said near-end user voice detector so that the amplitude of the sound produced by said loudspeaker is not increased when the near-end user speaks.

8. An adaptive volume controlled radiotelephone system comprising:

a microphone which generates an output electrical audio signal in response to noise sound;

a loudspeaker which produces sound in response to an input electrical audio signal:

a transceiver which is responsive to the microphone to transmit radiotelephone communications to a remote party and which receives radiotelephone communications from the remote party via radiofrequency channels to generate the input electrical audio signal;

an adaptive volume control which is responsive to the output electrical audio signal and which selects an amplitude of the sound produced by said loudspeaker so that the amplitude of the sound produced by said loudspeaker increases above the amplitude of the noise sound received at said microphone and decreases as the amplitude of the noise sound received at said microphone decreases so that said sound produced by said loudspeaker is not swamped out with respect to the noise sound received by said microphone and so that the sound produced by said loudspeaker is audible over the noise sound; and a volume estimator which estimates an amplitude of the radiotelephone communications received from the remote party, wherein said adaptive volume control is further responsive to said volume estimator so that variations in the amplitude of the sound produced by said loudspeaker resulting from variations in the amplitude of the received radiotelephone communications are reduced.

9. A method for adaptively controlling the volume of a radiotelephone comprising a microphone which generates an output electrical audio signal in response to sound, a loudspeaker which produces sound in response to an input electrical audio signal, and a transceiver which is responsive to the microphone to transmit radiotelephone communications to a remote party and which receives radiotelephone communications from the remote party, said method comprising the steps of:

generating the input electrical audio signal in response to the radiotelephone communications received from the remote party;

producing sound at said loudspeaker in response to the input electrical audio signal;

generating an output electrical audio signal at said microphone in response to noise sound;

transmitting readiotelephone communications to the remote party responsive to the output electrical audio signal;

selecting an amplitude of the sound produced by said loudspeaker so that the amplitude of the sound produced by said loudspeaker increases above the amplitude of the noise sound received at said microphone and the amplitude of the sound produced by said loudspeaker decreases as the amplitude of the noise sound received at said micrphone decreases so that said sound produced by said loudspeaker is not swamped out with respect to the noise sound received by said microphone and so that the sound produced by said loudspeaker is audible over the noise sound; and reducing an echo portion of the output electrical audio signal responsive to the input electrical audio signal so that the sound produced by said loudspeaker does not significantly affect operation of said amplitude selecting step.

10. A method according to claim 9 wherein said amplitude selecting step comprises selecting the amplitude of the sound produced by said loudspeaker when a near-end user is speaking so that the amplitude of the sound produced by said loudspeaker increases when the near-end user is speaking.

11. A method according to claim 9 further comprising the step of:

selectively increasing the amplitude of a high frequency portion of the input electrical audio signal to reduce overload in said loudspeaker and thereby increase intelligibility of human speech reproduced by said loudspeaker.

12. A method according to claim 9 further comprising the step of:

reducing a noise portion of the output electrical audio signal so that near-end user speech is more accurately transmitted to the remote party.

13. A method according to claim 8 wherein the output electrical audio signal with the reduced echo portion is transmitted to the remote party thereby reducing echo of the remote party's voice back to the remote party.

14. A method according to claim 9 wherein the reducing step comprises selectively reducing the echo portion of the output electrical audio signal.

15. A method for adaptively controlling the volume of a radiotelephone comprising a microphone which generates an output electrical audio signal in response to sound, a loudspeaker which produces sound in response to an input electrical audio signal, and a transceiver which is responsive to the microphone to transmit radiotelephone communications to a remote party and which receives radiotelephone communications from the remote party, said method comprising the steps of:

generating the input electrical audio signal in response to the radiotelephone communications received from the remote party;

producing sound at said loudspeaker in response to the input electrical audio signal;

generating an output electrical audio signal at said microphone in response to noise sound;

transmitting readiotelephone communications to the remote party responsive to the output electrical audio signal; and selecting an amplitude of the sound produced by said loudspeaker so that the amplitude of the sound produced by said loudspeaker increases above the amplitude of the noise sound received at said microphone and the amplitude of the sound produced by said loudspeaker decreases as the amplitude of the noise sound received at said micrphone decreases so that said sound produced by said loudspeaker is not swamped out with respect to the noise sound received by said microphone and so that the sound produced by said loudspeaker is audible over the noise sound;

wherein said amplitude selecting step comprises detecting when a near-end user is speaking and maintaining a constant amplitude of the sound produced by said loudspeaker when the near-end user is speaking so that the amplitude of the sound produced by said loudspeaker does not increase when the near-end user speaks.

16. A method for adaptively controlling the volume of a radiotelephone comprising a microphone which generates an output electrical audio signal in response to sound, a loudspeaker which produces sound in response to an input electrical audio signal, and a transceiver which is responsive to the microphone to transmit radiotelephone communications to a remote party and which receives radiotelephone communications from the remote party, said method comprising the steps of:

generating the input electrical audio signal in response to the radiotelephone communications received from the remote party;

producing sound at said loudspeaker in response to the input electrical audio signal;

generating an output electrical audio signal at said microphone in response to noise sound;

transmitting readiotelephone communications to the remote party responsive to the output electrical audio signal;

selecting an amplitude of the sound produced by said loudspeaker so that the amplitude of the sound produced by said loudspeaker increases above the amplitude of the noise sound received at said microphone and the amplitude of the sound produced by said loudspeaker decreases as the amplitude of the noise sound received at said micrphone decreases so that said sound produced by said loudspeaker is not swamped out with respect to the noise sound received by said microphone and so that the sound produced by said loudspeaker is audible over the noise sound;

estimating an amplitude of the radiotelephone communications received from the remote party; and reducing variations in the amplitude of the sound produced by said loudspeaker resulting from variations in the amplitude of the radiotelephone communications received from the remote party.

17. An adaptive volume controlled loudspeaker telephone system comprising:

receiver means for receiving telephone communications from a remote party and generating an input electrical audio signal in response thereto;

a loudspeaker which produces sound in response to the input electrical audio signal;

a microphone which generates an output electrical audio signal in response to noise sound;

transmitter means, responsive to said microphone, for transmitting telephone communications to the remote party;

an adaptive volume control which is responsive to the output electrical audio signal and which selects an amplitude of the sound produced by said loudspeaker so that the amplitude of the sound produced by said loudspeaker increases above the amplitude of the sound received at said microphone and decreases as the amplitude of the noise sound received at said microphone decreases so that said sound produced by said loudspeaker is not swamped out with respect to the noise sound received by said microphone and so that the sound produced by said loudspeaker is audible over the noise sound; and an echo reducer which is responsive to the input electrical audio signal and which reduces an echo portion of the output electrical audio signal so that the sound produced by said loudspeaker does not significantly affect operation of said adaptive volume control.

18. An adaptive volume controlled loudspeaker telephone system according to claim 17 wherein said adaptive volume control continues selecting the amplitude of the sound produced by said loudspeaker when the near-end user is speaking so that the amplitude of the sound produced by said loudspeaker increases when the near-end user is speaking.

19. An adaptive volume controlled loudspeaker telephone system according to claim 17 further comprising a loudspeaker overload reducer which is responsive to the selected amplitude of said volume control and which selectively increase the amplitude of a high frequency portion of the input electrical audio signal to reduce overload in said loudspeaker and thereby increase intelligibility of human speech reproduced by said loudspeaker.

20. An adaptive volume controlled loudspeaker telephone system according to claim 17 further comprising a noise suppressor which reduces a noise portion of the output electrical audio signal so that near-end user speech is more accurately transmitted to the remote party.

21. An adaptive volume controlled loudspeaker telephone system according to claim 17 wherein the transmitter means transmits the output electrical audio signal with the reduced echo portion thereby reducing echo of the remote party's voice back to the remote party.

22. An adaptive volume controlled loudspeaker telephone system according to claim 17 wherein the echo reducer selectively reduces the echo portion of the output electrical audio signal.

23. An adaptive volume controlled loudspeaker telephone system comprising:

receiver means for receiving telephone communications from a remote party and generating an input electrical audio signal in response thereto;

a loudspeaker which produces sound in response to the input electrical audio signal;

a microphone which generates an output electrical audio signal in response to noise sound;

transmitter means, responsive to said microphone, for transmitting telephone communications to the remote party;

an adaptive volume control which is responsive to the output electrical audio signal and which selects an amplitude of the sound produced by said loudspeaker so that the amplitude of the sound produced by said loudspeaker increases above the amplitude of the sound received at said microphone and decreases as the amplitude of the noise sound received at said microphone decreases so that said sound produced by said loudspeaker is not swamped out with respect to the noise sound received by said microphone and so that the sound produced by said loudspeaker is audible over the noise sound; and a near-end user voice detector which detects when a near-end user is speaking, wherein said adaptive volume control is further responsive to said near-end user voice detector so that the amplitude of the sound produced by said loudspeaker is not increased when the near-end user speaks.

24. An adaptive volume controlled loudspeaker telephone system comprising:

receiver means for receiving telephone communications from a remote party and generating an input electrical audio signal in response thereto;

a loudspeaker which produces sound in response to the input electrical audio signal;

a microphone which generates an output electrical audio signal in response to noise sound;

transmitter means, responsive to said microphone, for transmitting telephone communications to the remote party;

an adaptive volume control which is responsive to the output electrical audio signal and which selects an amplitude of the sound produced by said loudspeaker so that the amplitude of the sound produced by said loudspeaker increases above the amplitude of the sound received at said microphone and decreases as the amplitude of the noise sound received at said microphone decreases so that said sound produced by said loudspeaker is not swamped out with respect to the noise sound received by said microphone and so that the sound produced by said loudspeaker is audible over the noise sound; and a volume estimator which estimates an amplitude of the received telephone communications, wherein said adaptive volume control is further responsive to said volume estimator so that variations in the amplitude of the sound produced by said loudspeaker resulting from variations in the amplitude of the received telephone communications are reduced.

* * * * *

UNITED STATES PATENT AND TRADEMARK OFFICE
CERTIFICATE OF CORRECTION

PATENT NO. : 5,966,438
DATED : October 12, 1999
INVENTOR(S) : Eric D. Romesburg

It is certified that error appears in the above-identified patent and that said Letters Patent is hereby corrected as shown below:

<u>On the Cover Page</u>: Item [56]

Add the following U.S. Patent Documents:
| | | | |
|---|---|---|---|
| 2,288,959 | 11/95 | Shiono et al. | |
| 4,984,265 | 1/91 | Connan et al. | 379/390 |
| 5,199,065 | 3/93 | Von Zitzewitz et al. | 379/390 |
| 5,734,987 | 3/98 | Shinon et al. | 379/410 |

Claim 13, line 1 should read:
"13. A method according to claim 9 wherein the output"

Signed and Sealed this

Seventh Day of November, 2000

Attest:

Q. TODD DICKINSON

*Attesting Officer*      *Director of Patents and Trademarks*